(12) United States Patent
Song et al.

(10) Patent No.: US 9,306,615 B2
(45) Date of Patent: Apr. 5, 2016

(54) METHOD FOR COMMUNICATION TERMINAL TO RESIDE IN A PLURALITY OF NETWORKS AND COMMUNICATION TERMINAL

(75) Inventors: Hongping Song, Beijing (CN); Chao Gong, Beijing (CN)

(73) Assignee: ST-Ericsson SA, En Liquidation, Plan-les-Ouates (CH)

( * ) Notice: Subject to any disclaimer, the term of this patent is extended or adjusted under 35 U.S.C. 154(b) by 306 days.

(21) Appl. No.: 13/981,803

(22) PCT Filed: Jan. 20, 2012

(86) PCT No.: PCT/CN2012/070641
§ 371 (c)(1),
(2), (4) Date: Oct. 8, 2013

(87) PCT Pub. No.: WO2012/100728
PCT Pub. Date: Aug. 2, 2012

(65) Prior Publication Data
US 2014/0315595 A1    Oct. 23, 2014

(30) Foreign Application Priority Data

Jan. 26, 2011  (CN) .......................... 2011 1 0028873

(51) Int. Cl.
| | |
|---|---|
| H04M 1/00 | (2006.01) |
| H04B 1/401 | (2015.01) |
| H04W 48/16 | (2009.01) |
| H04W 60/00 | (2009.01) |

(52) U.S. Cl.
CPC ............... H04B 1/401 (2013.01); H04W 48/16 (2013.01); H04W 60/00 (2013.01)

(58) Field of Classification Search
CPC ............................... H04B 1/406; H04W 88/06
USPC ........ 455/552.1, 443, 444, 448; 370/328, 331
See application file for complete search history.

(56) References Cited

U.S. PATENT DOCUMENTS

2009/0103455 A1*  4/2009  Balasubramanian et al.  370/254

FOREIGN PATENT DOCUMENTS

| | | |
|---|---|---|
| CN | 101489309 A | 7/2009 |
| CN | 101924772 A | 12/2010 |
| CN | 102076061 A | 5/2011 |
| WO | 2007141159 A1 | 12/2007 |

* cited by examiner

*Primary Examiner* — Chuck Huynh
(74) *Attorney, Agent, or Firm* — Coats & Bennett, P.L.L.C.

(57) ABSTRACT

The present invention provides a method for a communication terminal to reside in a plurality of networks, and a communication terminal thereof. The method comprises the steps of: acquiring a first signal intensity corresponding to a first communication network and acquiring a second signal intensity corresponding to a second communication network; when the first signal intensity is greater than a first threshold, registering a first service in the first communication network; when the second signal intensity is greater than a second threshold, registering a second service in the second communication network; when the second signal intensity is less than or equal to the second threshold, searching for the second communication network and registering the second service in the first communication network; and when the first signal intensity is less than or equal to the first threshold, searching for the first communication network and registering the first service in the second communication network. According to the present invention, the communication terminal can operate at both the first communication network and the second communication network simultaneously, and can execute the first service and second service at the same time. As a result, it is able to ensure a normal, basic communication service as well as a high-speed data service.

10 Claims, 7 Drawing Sheets

METHOD FOR COMMUNICATION TERMINAL TO RESIDE IN A PLURALITY OF NETWORKS AND COMMUNICATION TERMINAL

FIELD OF THE INVENTION

The present invention relates to the field of communication terminals, in particular to a method for a communication terminal to reside in a plurality of networks and a communication terminal thereof.

DESCRIPTION OF THE PRIOR ART

With the development of the mobile communication technologies, it is necessary for operators to reserve the existing 2G (the Second Generation) mobile communication networks when 3G (the Third Generation) mobile communication networks are established and used continuously. On the one hand, the 2G network, as a mature technology, is still the most popular one for providing a user with high-quality voice services and data services. On the other hand, the 3G network, as an emerging communication technology, has the ability to carry high-speed data services and can provide the user with various data applications. However, due to low coverage of the 3G network, sometimes it is impossible for the user to be within the coverage area of the 3G network, thereby the user experience will be affected. In this case, the 3G and subsequent mobile communication technologies, merely through technology fusion, can help to ensure maximum development of the emerging mobile communication technologies. On the one hand, the technology fusion is present among wide-area public mobile communication networks, i.e., among the 3G public communication networks with different standards or among the 2G, 3G and 4G public mobile networks, so as to integrate network resources of the operators. On the other hand, the fusion of the mobile communication network, such as the 3G network, with a short-distance wireless network, such as Wireless Fidelity 802.11b (Wi-Fi), Radio Frequency Identification (RFID) and Bluetooth, will enable the construction of Smart Home and rich mobile information applications in every walk of life on the basis of a wide-area, high-speed wireless communication network.

Most of the existing communication terminals are dual-mode or multi-mode communication terminals, which can support 2G and 3G access technologies simultaneously but merely have one available communication network at any time, i.e., the communication terminal can merely reside in the 2G network or the 3G network. The communication terminal will reside in a 3G mode if a 3G signal is better, so any service initiated by the user will use the 3G network resources. The communication terminal will reside in a GSM (Global System for Mobile Communications) mode if a GSM signal is better.

The inventor finds that there exists the following problem in the prior art that the dual-mode or multi-mode communication terminal, which can merely reside in one communication network at the same time, cannot provide high-speed data services while providing the basic communication services due to the low coverage of the 3G network and the insufficient bandwidth provided by the 2G network for the data services.

SUMMARY OF THE INVENTION

An object of the present invention is to provide a method for a communication terminal to reside in a plurality of networks and a communication terminal thereof, so as to solve the problem that the dual-mode or multi-mode communication terminal, which can merely reside in one communication network at the same time, cannot provide high-speed data services while providing the basic communication services due to the low coverage of the 3G network and the insufficient bandwidth provided by the 2G network for the data services.

In order to achieve the above object, the present invention provides a method for a communication terminal to reside in a plurality of networks, comprising: supporting, by the communication terminal, a first communication network in which a first service and a second service can be realized and a second communication network in which the first service and the second service can be realized; after the communication terminal is powered on, acquiring a first signal intensity corresponding to the first communication network and a second signal intensity corresponding to the second communication network; when the first signal intensity is greater than a first threshold, registering a first service in the first communication network, and when the second signal intensity is greater than a second threshold, registering a second service in the second communication network; and if it is judged that the current second signal intensity is less than or equal to the second threshold, searching for the second communication network in accordance with a first predetermined strategy and registering the second service in the first communication network, or if it is judged that the current first signal intensity is less than or equal to the first threshold, searching for the first communication network in accordance with a second predetermined strategy and registering the first service in the second communication network.

The first communication network is a 2G network while the second communication network is a 3G network. The first service is a CS service while the second service is a PS service.

The step of searching for the second communication network in accordance with the first predetermined strategy comprises: acquiring a second signal intensity corresponding to the second communication network in accordance with a second protocol stack and stopping the searching for the second communication network when the second signal intensity is greater than a modified threshold of the second communication network. The step of searching for the first communication network in accordance with the second predetermined strategy comprises: acquiring a first signal intensity corresponding to the first communication network in accordance with a first protocol stack and stopping the searching for the first communication network when the first signal intensity is greater than a threshold of the first communication network. Protocols that support the connection and communication between the communication terminal and the second communication network are stored in the second protocol stack, while protocols that support the connection and communication between the communication terminal and the first communication network are stored in the first protocol stack.

The step of registering the second service in the first communication network comprises registering the second service in the first communication network in accordance with a first protocol stack. The step of registering the first service in the second communication network comprises registering the first service in the second communication network in accordance with a second protocol stack. Protocols that support the connection and communication between the communication terminal and the second communication network are stored in the second protocol stack, while protocols that support the connection and communication between the communication terminal and the first communication network are stored in the first protocol stack.

The step of acquiring a second signal intensity corresponding to the second communication network in accordance with the second protocol stack further comprises: acquiring, by the first protocol stack, a second communication network neighboring cell in system information, and notifying the second protocol stack of the second communication network neighboring cell so as to assist the second protocol stack to narrow the range of searching for cells. The step of acquiring the first signal intensity corresponding to the first communication network in accordance with the first protocol stack further comprises: acquiring, by the second protocol stack, a first communication network neighboring cell in system information, and notifying the first protocol stack of the first communication network neighboring cell so as to assist the first protocol stack to narrow the range of searching for cells.

Subsequent to judging that the current second signal intensity is less than or equal to the second threshold, the method further comprises notifying, by the second protocol stack, the first protocol stack to execute routing update. Subsequent to judging that the current first signal intensity is less than or equal to the first threshold, the method further comprises notifying, by the first protocol stack, the second protocol stack to execute position update.

The present invention further provides a communication terminal, comprising: a main controlling unit configured to support the communication terminal to establish a communication with a first communication network and a second communication network; a service managing module configured to support a first service and a second service to be realized in both the first communication network and the second communication terminal; a communication mode managing module configured to, after the communication terminal is powered on, acquire a first signal intensity corresponding to the first communication network and a second signal intensity corresponding to the second communication network; a first communication protocol module configured to, when the first signal intensity is greater than a first threshold, register the first service in the first communication network, after the first service is registered successfully, search for the second communication network in accordance with a first predetermined strategy if an indication indicating that the acquired second signal intensity is less than a second threshold is received from a second communication protocol module, and register the second service in the first communication network; and a second communication protocol module configured to, when the second signal intensity is greater than the second threshold, register the second service in the second communication network, after the second service is registered successfully, search for the first communication network in accordance with a second predetermined strategy if an indication indicating that the acquired first signal intensity is less than or equal to a first threshold is received from the first communication network, and register the first service in the second communication network.

The first communication network is a 2G network while the second communication network is a 3G network. The first service is a CS service while the second service is a PS service.

The first communication protocol module is further configured to, after receiving an indication indicating that the acquired second signal intensity corresponding to the second communication network is less than or equal to the second threshold, register the second service in the first communication network. The second communication protocol module is further configured to, after receiving an indication indicating that the acquired first signal intensity corresponding to the first communication network is less than or equal to the first threshold, register the first service in the second communication network. Protocols that support the connection and communication between the communication terminal and the second communication network are stored in the second protocol stack, while protocols that support the connection and communication between the communication terminal and the first communication network are stored in the first protocol stack.

The first communication protocol module is further configured to acquire a second communication network neighboring cell in system information, and notify the second communication protocol module of the second communication network neighboring cell so as to assist the second communication protocol module to narrow the range of searching for cells. The second communication protocol module is further configured to acquire a first communication network neighboring cell in system information, and notify the first communication protocol module of the first communication network neighboring cell so as to assist the first communication protocol module to narrow the range of searching for cells.

The present invention has the following beneficial effect. The communication terminal supports to register the first service and the second service in the first communication network, and supports to register the first service and the second service in the second communication network, so it can operate at both the first communication network and the second communication network simultaneously. As a result, the communication terminal is able to execute the first service and second service at the same time, i.e., it is able to ensure a normal, basic communication service as well as a high-speed data service.

DETAILED DESCRIPTION OF THE PREFERRED EMBODIMENTS

To make the technical problems, the technical solutions and the advantages of the present invention more apparent, the present invention is described hereinafter in conjunction with the drawings.

Figure 2:
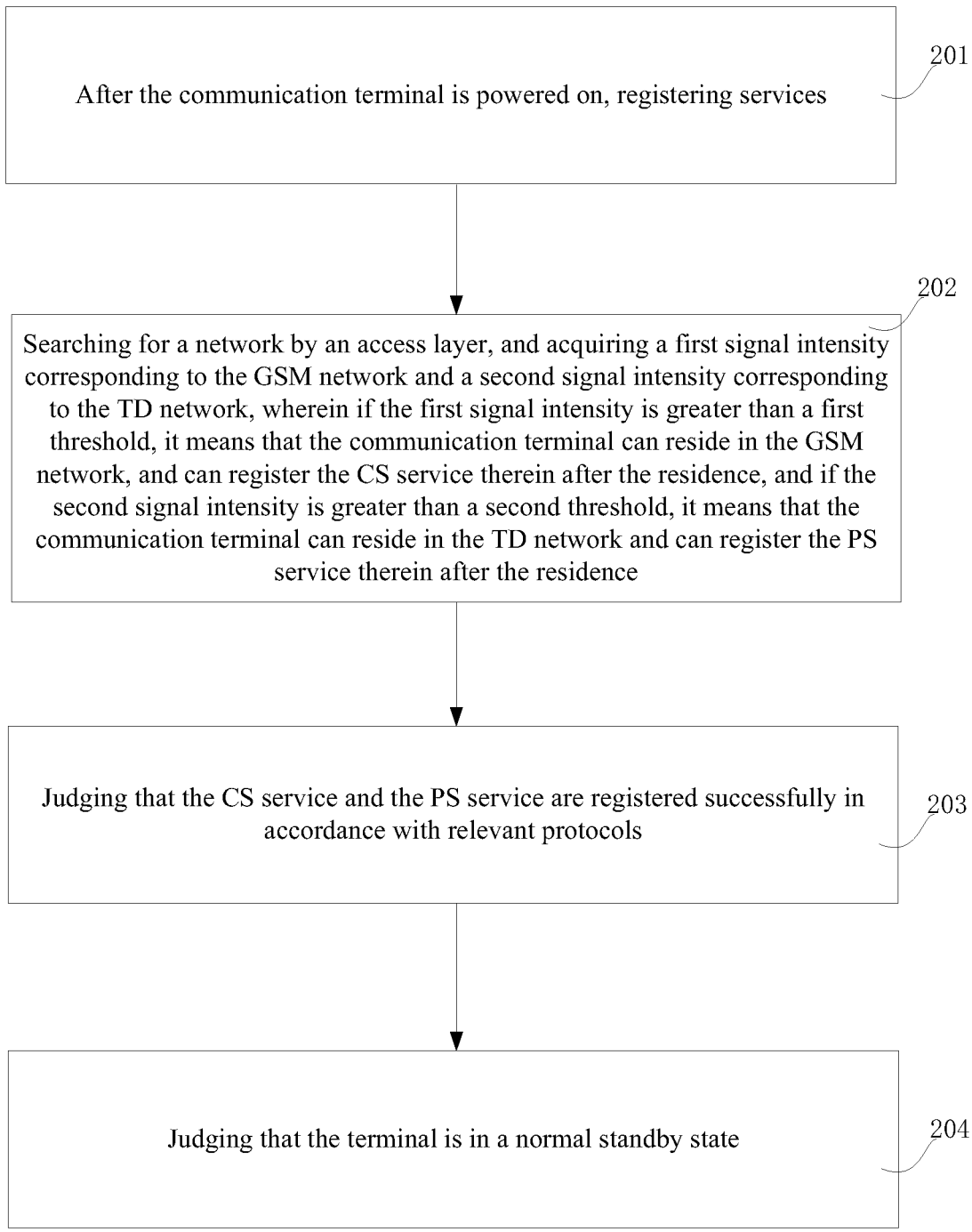
FIG. 2 is a work flow chart of a single-card-dual-standby-dual-call communication terminal after it is powered on according to embodiments of the present invention.

If, a single-card-dual-standby-dual-call communication terminal is currently at a position where there are suitable cells for both a Time Division-Synchronous Code Division Multiple Access (TD-SCDMA) network and a GSM network, the provided technical solution may be applied to the communication terminal, and after it is powered on, the work flow, as shown in FIG. 2, comprises the following steps.

Step 201: after the communication terminal is powered on, registering services, i.e., registering a first service and a second service in different communication networks.

The communication network may be a first communication network, a second communication network or a communication network of any other type. In general, the first communication network may be a 2G network, e.g., a GSM network, while the second communication may be a 3G network, e.g., a TD-SCDMA network (TD network for abbreviation). The first service is a CS service, while the second service is a PS service.

Step 202: searching for a network by an access layer, and acquiring a first signal intensity corresponding to the GSM network and a second signal intensity corresponding to the TD network.

If the first signal intensity is greater than a first threshold, it means that the communication terminal can reside in the GSM network, and can register the CS service therein after the residence. If the second signal intensity is greater than a second threshold, it means that the communication terminal can reside in the TD network and can register the PS service therein after the residence.

Step 203: judging that the CS service and the PS service are registered successfully in accordance with relevant protocols.

Step 204: judging that the terminal is in a normal standby state, i.e., in a TD-SCDMA/GSM single-card-dual-standby-dual-call mode.

The communication terminal is not always at a position where there are suitable cells for both the TD network and the GSM network, so it is necessary to apply the provided technical solution to optimize the functions of the communication terminal.

Figure 1:
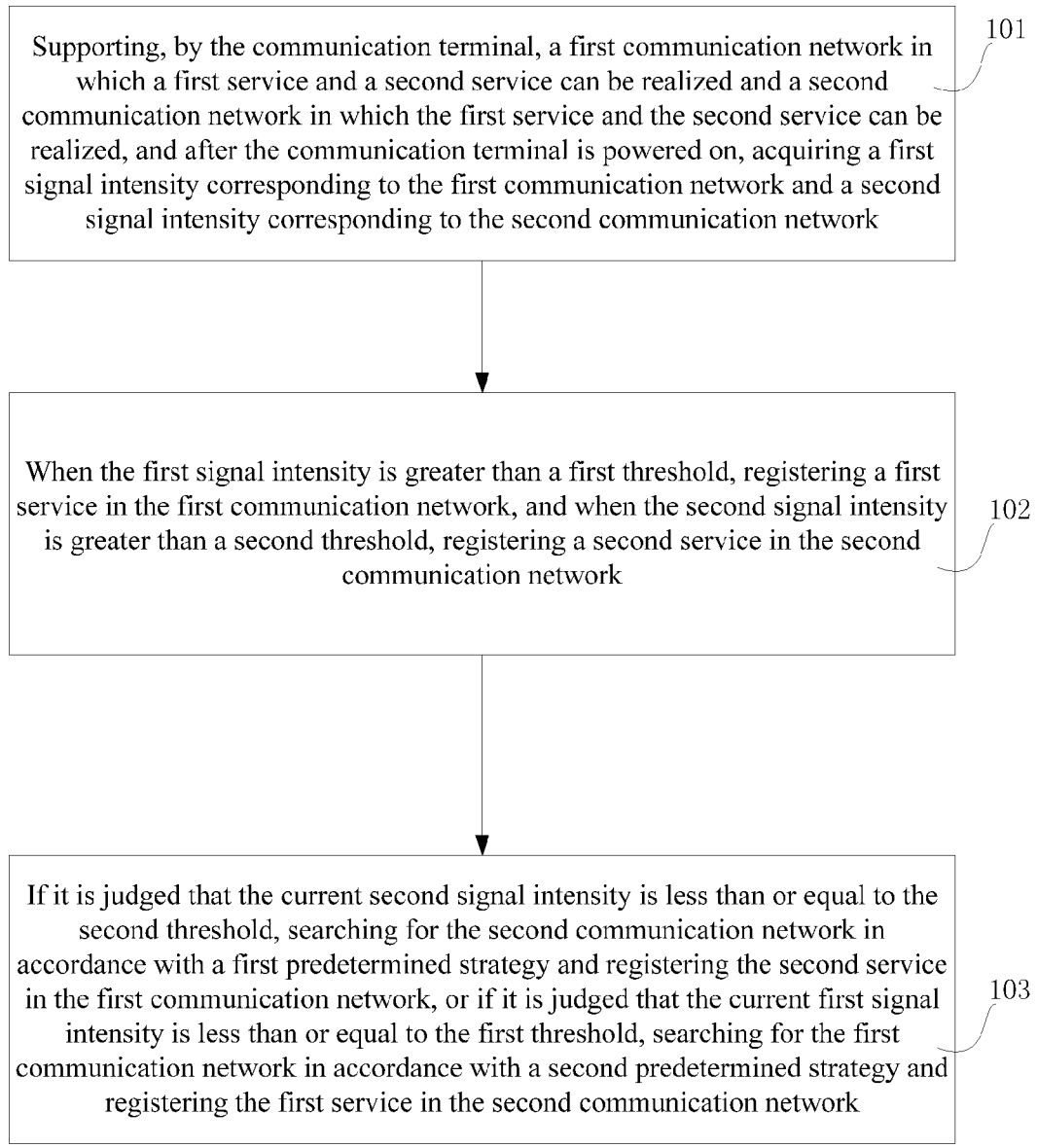
FIG. 1 is a flow chart of a method for a communication terminal to reside in a plurality of networks according to embodiments of the present invention.

The present invention provides a method for a communication terminal to reside in a plurality of networks which, as shown in FIG. 1, comprises the following steps:

Step 101: supporting, by the communication terminal, a first communication network in which a first service and a second service can be realized and a second communication network in which the first service and the second service can be realized, and after the communication terminal is powered on, acquiring a first signal intensity corresponding to the first communication network and a second signal intensity corresponding to the second communication network;

Step 102: when the first signal intensity is greater than a first threshold, registering a first service in the first communication network, and when the second signal intensity is greater than a second threshold, registering a second service in the second communication network; and Step 103: if it is judged that the current second signal intensity is less than or equal to the second threshold, searching for the second communication network in accordance with a first predetermined strategy and registering the second service in the first communication network, or if it is judged that the current first signal intensity is less than or equal to the first threshold, searching for the first communication network in accordance with a second predetermined strategy and registering the first service in the second communication network.

According to the method of the present invention, the communication terminal supports to register the first service and the second service in the first communication network, and the supports to register the first service and the second service in the second communication network, so it can operate at both the first communication network and the second communication network simultaneously. As a result, the communication terminal is able to execute the first service and second service at the same time, i.e., it is able to ensure a normal, basic communication service as well as a high-speed data service.

The first communication network is a 2G network, e.g., a GSM network while the second communication network is a 3G network, e.g., a TD network. The first service is a CS service while the second service is a PS service.

The step of searching for the second communication network in accordance with a first predetermined strategy comprises: acquiring a second signal intensity corresponding to the second communication network in accordance with a second protocol stack and stopping the searching for the second communication network when the second signal intensity is greater than a modified threshold of the second communication network. The step of searching for the first communication network in accordance with a second predetermined strategy comprises: acquiring a first signal intensity corresponding to the first communication network in accordance with a first protocol stack and stopping the searching for the first communication network when the first signal intensity is greater than a threshold of the first communication network. Protocols that support the connection and communication between the communication terminal and the second communication network are stored in the second protocol stack, while protocols that support the connection and communication between the communication terminal and the first communication network are stored in the first protocol stack.

The step of registering the second service in the first communication network comprises registering the second service in the first communication network in accordance with a first protocol stack. The step of registering the first service in the second communication network comprises registering the first service in the second communication network in accordance with a second protocol stack.

Figure 3:
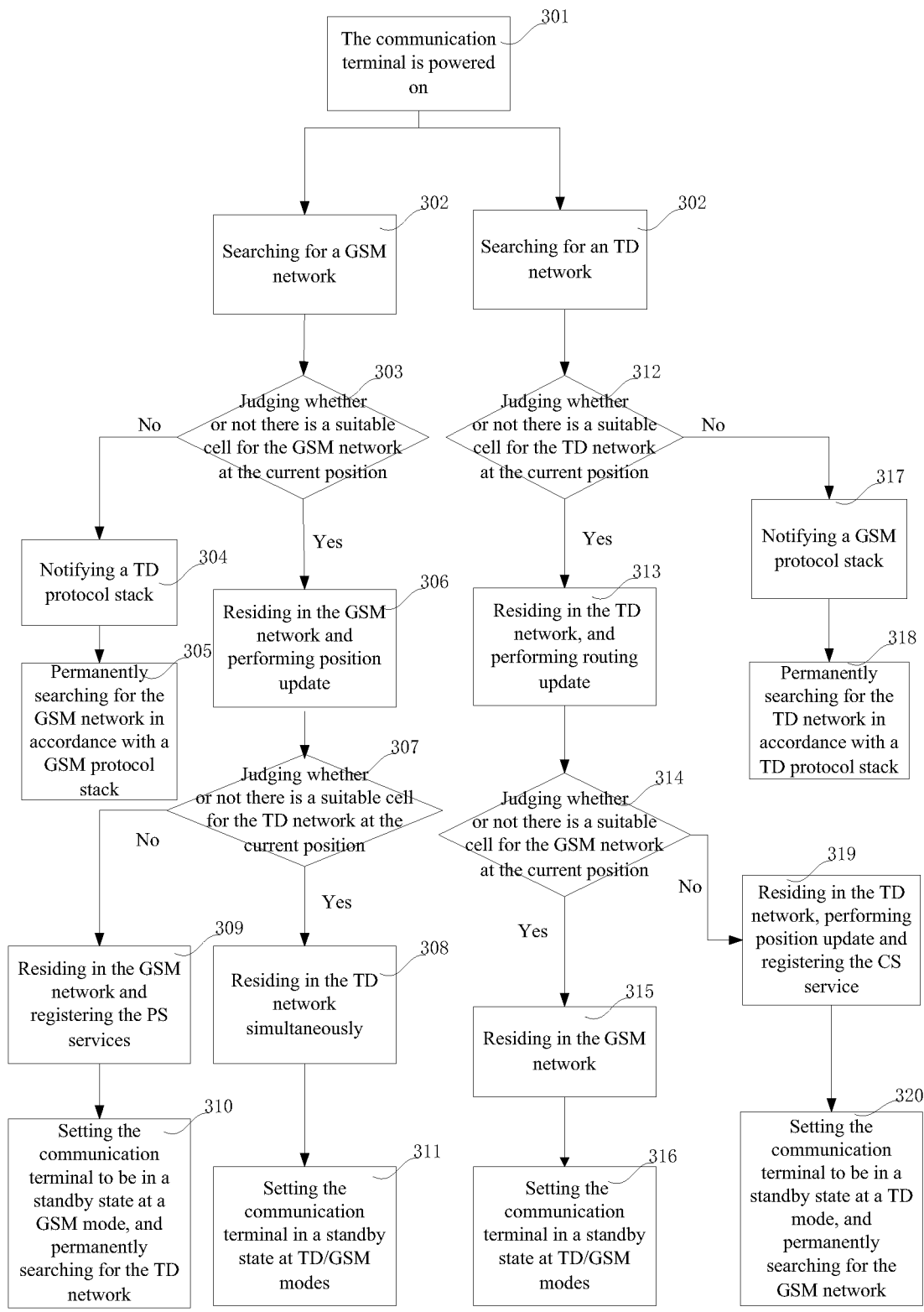
FIG. 3 is a flow chart of the service registration of a TD-SCDMA/GSM single-card-dual-standby-dual-call communication terminal according to embodiments of the present invention.

During the power-on and registration of the TD-SCDMA/GSM single-card-dual-standby-dual-call communication terminal, when the communication terminal is powered on, the access layers of the GSM network and the TD network begin to search for the communication network. If both the GSM network and the TD network can be found, the CS service may be registered in the GSM network when the communication terminal can reside in the GSM network, and the PS service may be registered in the TD network when the communication terminal can reside in the TD network. The registration may be performed in any order or simultaneously, e.g., the corresponding service may be registered in a network after the communication terminal can normally reside in the network. As shown in FIG. 3, the step for the communication terminal to reside in the GSM network and the TD network and registering the corresponding services comprises:

Step 301: after the TD-SCDMA/GSM single-card-dual-standby-dual-call communication terminal is powered on, beginning to register the services;

Step 302: searching for the GSM network, i.e., acquiring the first signal intensity corresponding to the GSM network, and proceeding to Step 303, or searching for the TD network, i.e., acquiring the second signal intensity corresponding to the TD network, and proceeding to Step 312, the first communication network being a 2G network, e.g., a GSM network and the second communication network being a 3G network, e.g., a TD network;

Step 303: judging whether or not there is GSM network coverage at the current position, if yes, proceeding to Step 306, and otherwise proceeding to Step 304;

Step 304: notifying a TD protocol stack;

Step 305: permanently searching for the GSM network in accordance with a GSM protocol stack, and terminating the procedure;

Step 306: enabling the communication terminal to reside in the GSM network and performing position update in the GSM network;

Step 307: judging whether or not there is TD network coverage at the current position, if yes, proceeding to Step 308, and otherwise proceeding to Step 309;

Step 308: enabling the communication terminal to reside in the TD network, and proceeding to Step 311;

Step 309: enabling the communication terminal to reside in the GSM network and registering the PS services in accordance with the GSM protocol stack;

Step 310: setting the communication terminal to be in a standby state at a GSM mode, permanently searching for the TD network, stopping the searching when a suitable TD network cell has been found, and terminating the procedure;

Step 311: setting the communication terminal at a TD-SCDMA/GSM single-card-dual-standby-dual-call mode, and terminating the procedure;

Step 312: when the communication terminal has acquired the second signal intensity corresponding to the TD network, judging whether or not there is TD network coverage at the current position, if yes, proceeding to Step 313, and otherwise proceeding to Step 317;

Step 313: when it is judged that there is the TD network coverage at the current position, enabling the communication terminal to reside in the TD network, and performing routing update;

Step 314: judging again whether or not there is a suitable cell for the GSM network at the current position, if yes, proceeding to Step 315, and otherwise proceeding to Step 319;

Step 315: enabling the communication terminal to reside in the GSM network;

Step 316: setting the communication terminal at a TD-SCDMA/GSM single-card-dual-standby-dual-call mode, and terminating the procedure;

Step 317: notifying the GSM protocol stack;

Step 318: permanently searching for the TD network, and terminating the procedure;

Step 319: residing in the TD network, performing position update and registering the CS service; and Step 320: setting the communication terminal to be in a standby state at the TD-SCDMA mode, permanently searching for the GSM network, and stopping the searching when a suitable GSM network cell has been found, and terminating the procedure.

Steps 303 to 311 are used to search for the GSM network, and the corresponding processes are performed in accordance with the search result. Steps 312 to 320 are used to search for the TD network, and the corresponding processes are performed in accordance with the search result. Moreover, the communication terminal can perform Steps 303 to 311 and Steps 312 to 320 synchronously. If it is also necessary to perform Step 318 to permanently search for the TD network when the communication terminal performs Step 305 to search for the GSM network in accordance with the GSM protocol stack, it means that, at the current position, the signal intensity corresponding to the GSM network and that corresponding to the TD network are low, and no suitable cell can be found. At this time, the communication terminal shall permanently search for the corresponding network and stop searching until it can be in a standby state at a single mode or at a dual mode.

The step of searching for the second communication network in accordance with a first predetermined strategy and registering the second service in the first communication network further comprises: acquiring, by the first protocol stack, a TD neighboring cell in system information (e.g., SI2qter), and notifying the second protocol stack of the acquired TD neighboring cell. The step of searching for the first communication network in accordance with a second predetermined strategy and registering the first service in the second communication network further comprises: acquiring, by the second protocol stack, a TD neighboring cell in a system information block 11 (SIB11), and notifying the first protocol stack of the TD neighboring cell.

Subsequent to the step of acquiring the second signal intensity corresponding to the second communication network in accordance with the second protocol stack, the method further comprises: notifying, by the second protocol stack, the first protocol stack to perform routing update. Subsequent to the step of acquiring the first signal intensity corresponding to the first communication network in accordance with the first protocol stack, the method further comprises: notifying, by the first protocol stack, the second protocol stack to perform position update.

Figure 4:
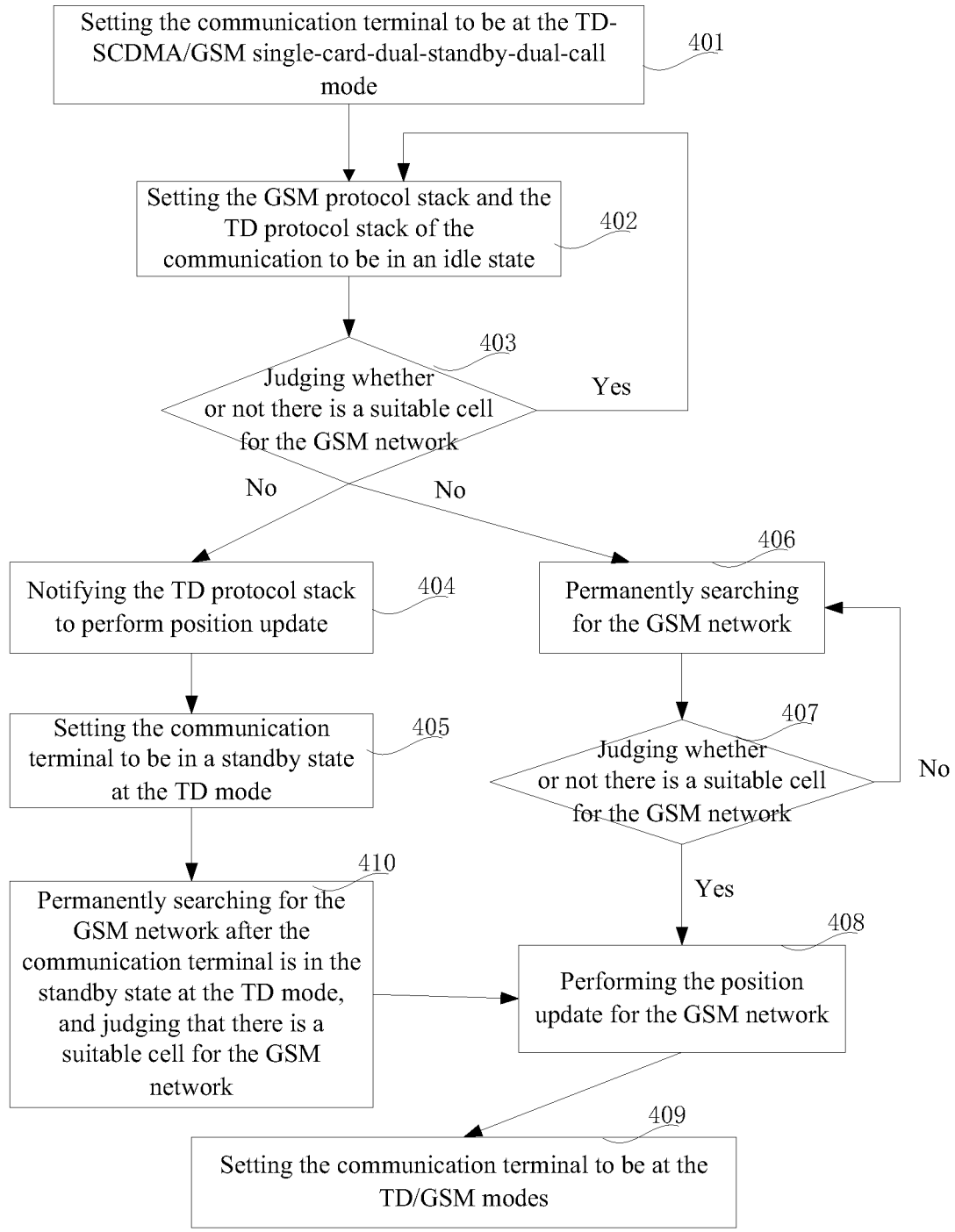
FIG. 4 is a flow chart of the method when the coverage of a GSM network is lost according to embodiments of the present invention.

As shown in FIG. 4, after the GSM network coverage is lost, the following process will be performed.

In general, the first communication network is a 2G network, e.g., a GSM network while the second communication network is a 3G network, e.g., a TD network, and the first protocol stack is a GSM protocol stack while the second protocol stack is a TD protocol stack. When both the TD protocol stack and the GSM protocol stack are in an idle state, if it is impossible to find a suitable cell for the GSM network at the current position and it is still unable to find the suitable cell for the GSM network after a full-range search, the GSM protocol stack will be in a permanent search state and the communication terminal will notify the TD protocol stack to perform the position update. If it is able to find the suitable cell for the GSM network, the communication terminal will notify the TD protocol stack to perform the position update. The process includes the following steps:

Step 401: setting the communication terminal to be at the TD-SCDMA/GSM single-card-dual-standby-dual-call mode;

Step 402: setting the GSM protocol stack and the TD protocol stack of the communication terminal to be in an idle state;

Step 403: judging whether or not there is still a suitable cell for the GSM network, if not, proceeding to Steps 404 and 406, and otherwise proceeding to Step 402;

Step 404: notifying the TD protocol stack to perform the position update;

Step 405: setting the communication terminal to be in a standby state at the TD mode, and proceeding to Step 410;

Step 406: permanently searching for the GSM network;

Step 407: judging whether or not there is a suitable cell for the GSM network, if yes, proceeding to Step 408, and otherwise proceeding to Step 406;

Step 408: performing the position update for the GSM network;

Step 409: setting the communication terminal to be at the TD-SCDMA/GSM single-card-dual-standby-dual-call mode, and terminating the procedure; and Step 410: permanently searching for the GSM network after the communication terminal is in the standby state at the TD mode, and if it is judged that there is a suitable cell for the GSM network, proceeding to Step 408.

Figure 5:
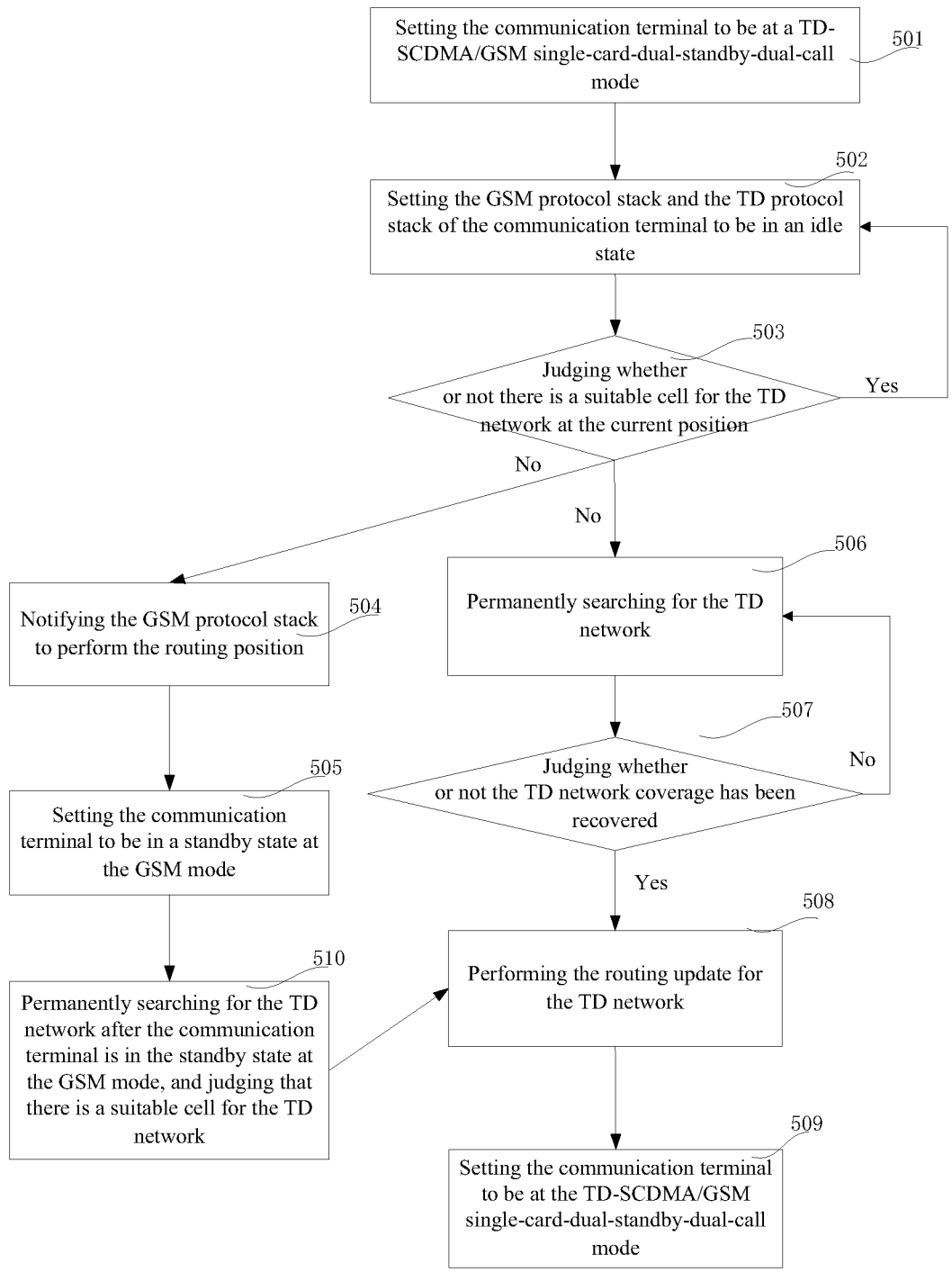
FIG. 5 is a flow chart of the method when the coverage of a TD-SCDMA network is lost according to embodiments of the present invention.

As shown in FIG. 5, after the TD-SCDMA network coverage is lost, the following process will be performed.

When the TD-SCDMA/GSM single-card-dual-standby-dual-call communication terminal loses its TD-SCDMA network coverage and both the TD protocol stack and the GSM protocol stack are in an idle state, the TD protocol stack will permanently search for the TD network and the communication terminal will notify the GSM protocol stack to perform the routing update if it is still unable to find a suitable TD cell after a full-range search. If the TD network coverage is recovered, the communication terminal will notify the GSM protocol to perform the routing update. The process includes the following steps:

Step 501: setting the communication terminal to be at a TD-SCDMA/GSM single-card-dual-standby-dual-call mode;

Step 502: setting the GSM protocol stack and the TD protocol stack of the communication terminal to be in an idle state;

Step 503: judging whether or not there is still the TD network coverage, if not, proceeding to Steps 504 and 506, and if yes proceeding to Step 502;

Step 504: notifying the GSM protocol stack to perform the routing position;

Step 505: setting the communication terminal to be in a standby state at the GSM mode, and proceeding to Step 510;

Step 506: permanently searching for the TD network;

Step 507: judging whether or not the TD network coverage has been recovered, if yes, proceeding to Step 508, and otherwise proceeding to Step 506;

Step 508: performing the routing update for the TD network;

Step 509: setting the communication terminal to be at the TD-SCDMA/GSM single-card-dual-standby-dual-call mode; and Step 510: after the communication terminal is in a standby state at the GSM mode, permanently searching for the TD network, and after it is judged that there is a suitable cell for the TD network, proceeding to Step 508.

Figure 6:
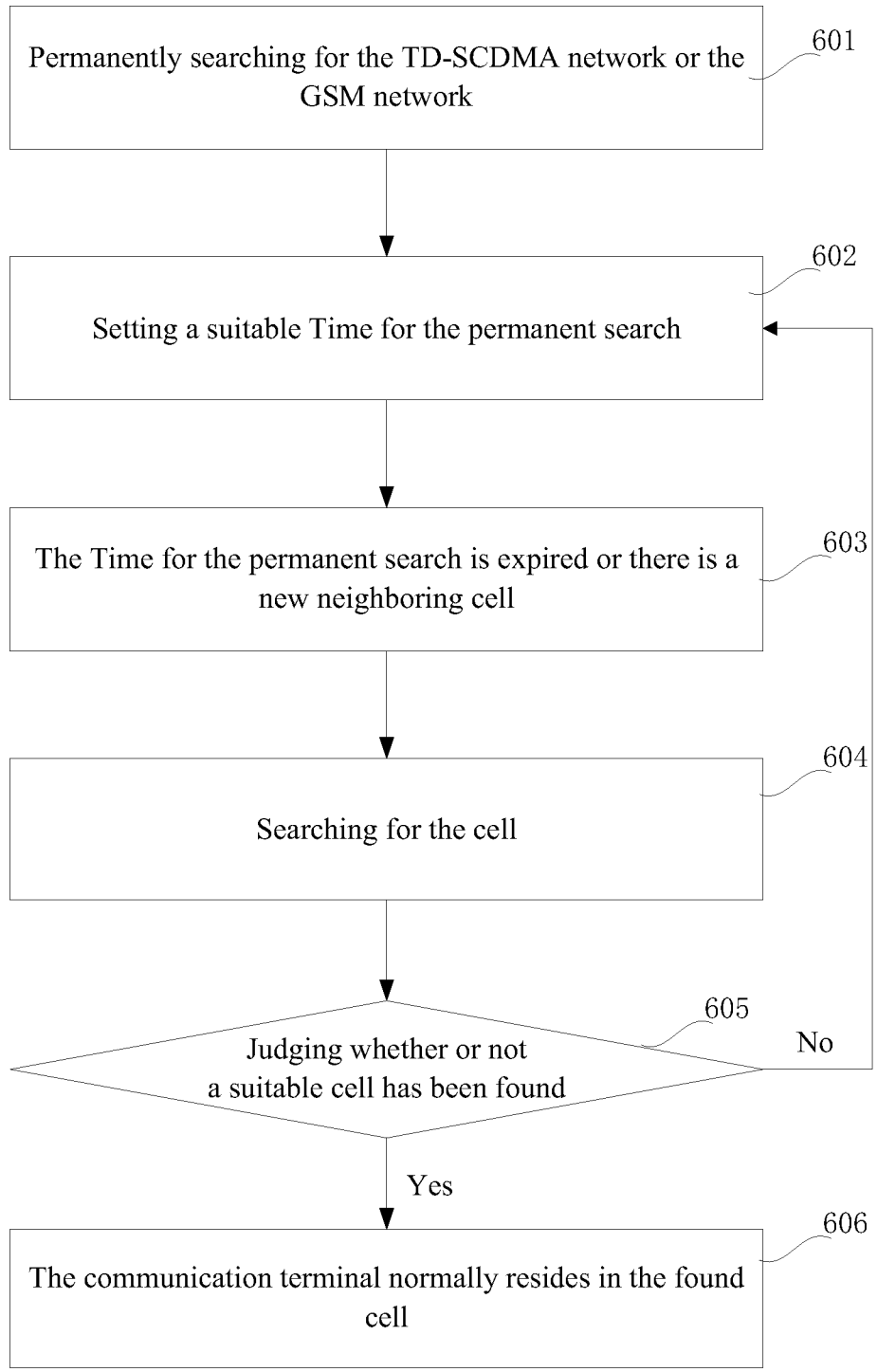
FIG. 6 is a flow chart of permanent search according to embodiments of the present invention.

The processes shown in FIGS. 4 and 5 both include permanent search. The TD-SCDMA/GSM single-card-dual-standby-dual-call communication terminal needs to support the operation on the two communication networks simultaneously, so this communication terminal is more power-hungry than a common dual-mode terminal. In addition, the other access network can still provide normal single-mode-single-standby services when one access network is lost, so as compared with the common dual-mode terminal, a longer period may be adopted by this communication terminal for the permanent search after the loss of one access network. Also, neighboring cells of a disparate network configured with the network may be used to narrow the range of permanent search, so as to reduce the power consumption. The process of permanent search, as shown in FIG. 6, comprises the following steps:

Step 601: permanently searching for the TD-SCDMA network or the GSM network, wherein the TD-SCDMA network and the GSM network are disparate networks with each other;

Step 602: setting a suitable period (Time) for the permanent search;

Step 603: judging that the period (Time) for the permanent search is expired or there is a new neighboring cell;

Step 604: searching for the cell;

Step 605: judging whether or not a suitable cell has been found, if yes, proceeding to Step 606, and otherwise proceeding to Step 602; and Step 606: enabling the communication terminal to normally reside in the found cell which is suitable for the TD-SCDMA network or the GSM network.

Figure 7:
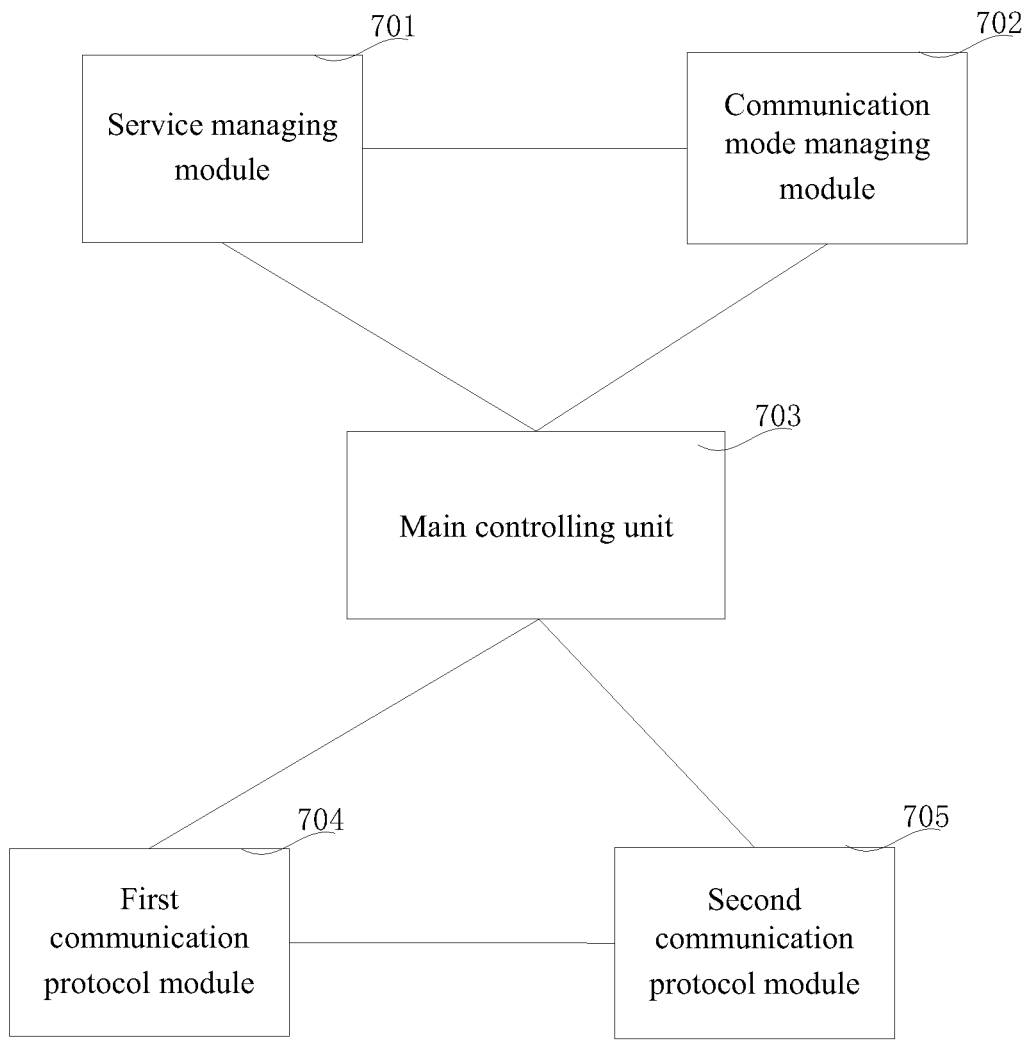
FIG. 7 is a structural schematic view showing a communication terminal according to embodiments of the present invention.

The present invention further provides a communication terminal which, as shown in FIG. 7, comprises:

a main controlling unit 703, configured to support the communication terminal to establish a communication with a first communication network and a second communication network;

a service managing module 701, configured to support a first service and a second service to be realized in both the first communication network and the second communication terminal;

a communication mode managing module 702, configured to, after the communication terminal is powered on, acquire a first signal intensity corresponding to the first communication network and a second signal intensity corresponding to the second communication network;

a first communication protocol module 704, configured to, when the first signal intensity is greater than a first threshold, register the first service in the first communication network, after the first service is registered successfully, register the second service in the first communication network if the acquired second signal intensity is less than or equal to a second threshold, and search for the first communication network in accordance with a second predetermined strategy when the first signal intensity is less than or equal to the first threshold; and a second communication protocol module 705, configured to, when the second signal intensity is greater than the second threshold, register the second service in the second communication network, after the second service is registered successfully, register the first service in the second communication network if the current first signal intensity is less than or equal to the first threshold, and search for the second communication network in accordance with a first predetermined strategy when the second signal intensity is less than or equal to the second threshold.

According to the communication terminal of the present invention, the communication terminal supports to register the first service and the second service in the first communication network, and the supports to register the first service and the second service in the second communication network, so it can operate at both the first communication network and the second communication network simultaneously. As a result, the communication terminal is able to execute the first service and second service at the same time, i.e., it is able to ensure a normal, basic communication service as well as a high-speed data service.

The first communication network is a 2G network while the second communication network is a 3G network, and the first service is a CS service while the second service is a PS service.

The first communication protocol module 704 is further configured to, after receiving a notification from the second communication protocol module 705 indicating that the acquired second signal intensity corresponding to the second communication network is less than or equal to the second threshold, register the second service in the first communication network. The second communication protocol stack 705 acquires the second signal intensity that is less than or equal to the second threshold.

The second communication protocol module 705 is further configured to, after receiving a notification from the first communication protocol module 704 indicating that the acquired first signal intensity corresponding to the first communication network is less than or equal to the first threshold, register the first service in the second communication network. The first communication protocol module 704 acquires the first signal intensity that is less than or equal to the first threshold. Protocols that support the connection and communication between the communication terminal and the second communication network are stored in the second communication protocol module 705, while protocols that support the connection and communication between the communication terminal and the first communication network are stored in the first communication protocol module 704.

The first communication protocol module 704 is further configured to acquire a second communication network neighboring cell in SI2qter, and notify the second communication protocol module of the acquired second communication network neighboring cell so as to assist the second communication protocol module 705 to narrow the range of searching for cells.

The second communication protocol module 705 is further configured to acquire a first communication network neighboring cell in a SIB11, and notify the first communication protocol module of the acquired first communication network neighboring cell so as to assist the first communication protocol module 704 to narrow the range of searching for cells.

As can be seen from the above, with respect to the power-on mode and the network-searching mode of the disclosed single-card-dual-standby-dual-call communication terminal, the main controlling unit 703, during the power-on and registration, identifies the service domains requested to be registered by the communication terminal, and maps the preferred communication protocol modules for the service domains respectively, e.g., the first communication protocol module 704 is preferably used for the CS service, while the second communication protocol module 705 is preferably used for the PS service. The first communication protocol module 704 and the second communication protocol module 705 establish a connection with the network with the respective mode, perform the service registration and enter a dual-standby mode. In the dual-standby mode, if a communication protocol module loses its connection with the corresponding network or it is insufficient to provide a high-quality service, it will transfer the service at this communication mode to be at the other communication mode so as to be in a standby state or to continue to perform the service, and monitor the network in real time. After the coverage or the service quality is recovered, it will transfer the service back to be at the communication mode so as to be in a standby state or to perform the service.

The above are merely the preferred embodiments of the present invention. It should be noted that, a person skilled in the art may further make improvements and modifications without departing from the principle of the present invention, and these improvements and modifications shall also be considered as the scope of the present invention.

What is claimed is:

1. A method for a communication terminal to reside in a plurality of networks, comprising:
   supporting, by the communication terminal, a first communication network in which a first service and a second service can be realized, and a second communication network in which the first service and the second service can be realized;
   after the communication terminal is powered on, acquiring a first signal intensity corresponding to the first communication network and a second signal intensity corresponding to the second communication network;
   when the first signal intensity is greater than a first threshold, registering a first service in the first communication network, and when the second signal intensity is greater than a second threshold, registering a second service in the second communication network; and
   when the current second signal intensity is less than or equal to the second threshold, searching for the second communication network in accordance with a first predetermined strategy and registering the second service in the first communication network; and
   when the current first signal intensity is less than or equal to the first threshold, searching for the first communication network in accordance with a second predetermined strategy and registering the first service in the second communication network.

2. The method of claim 1, wherein the first communication network is a 2G network, the second communication network is a 3G network, the first service is a circuit-switched (CS) service, and the second service is a packet-switched (PS) service.

3. The method of claim 1:
   wherein searching for the second communication network in accordance with the first predetermined strategy comprises acquiring a second signal intensity corresponding to the second communication network in accordance with a second protocol stack and stopping the searching for the second communication network when the second signal intensity is greater than a modified threshold of the second communication network;
   wherein searching for the first communication network in accordance with the second predetermined strategy comprises acquiring a first signal intensity corresponding to the first communication network in accordance with a first protocol stack and stopping the searching for the first communication network when the first signal intensity is greater than a threshold of the first communication network; and
   wherein protocols that support the connection and communication between the communication terminal and the second communication network are stored in the second protocol stack, and protocols that support the connection and communication between the communication terminal and the first communication network are stored in the first protocol stack.

4. The method of claim 1:
   wherein registering the second service in the first communication network comprises registering the second service in the first communication network in accordance with a first protocol stack;
   wherein registering the first service in the second communication network comprises registering the first service in the second communication network in accordance with a second protocol stack; and
   wherein protocols that support the connection and communication between the communication terminal and the second communication network are stored in the second protocol stack, and protocols that support the connection and communication between the communication terminal and the first communication network are stored in the first protocol stack.

5. The method of claim 3:
   wherein acquiring the second signal intensity corresponding to the second communication network in accordance with the second protocol stack further comprises acquiring, by the first protocol stack, a second communication network neighboring cell in system information, and notifying the second protocol stack of the second communication network neighboring cell to assist the second protocol stack to narrow the range of searching for cells; and wherein acquiring the first signal intensity corresponding to the first communication network in accordance with the first protocol stack further comprises acquiring, by the second protocol stack, a first communication network neighboring cell in system information, and notifying the first protocol stack of the first communication network neighboring cell to assist the first protocol stack to narrow the range of searching for cells.

6. The method of claim 1, further comprising:

subsequent to judging that the current second signal intensity is less than or equal to the second threshold, notifying, by the second protocol stack, the first protocol stack to execute a routing update; and subsequent to judging that the current first signal intensity is less than or equal to the first threshold, notifying, by the first protocol stack, the second protocol stack to execute a position update.

7. A communication terminal comprising:

one or more processing circuits implementing:

a main controlling unit, configured to support the communication terminal to establish a communication with a first communication network and a second communication network;

a service managing module, configured to support a first service and a second service to be realized in both the first communication network and the second communication network;

a communication mode managing module, configured to, after the communication terminal is powered on, acquire a first signal intensity corresponding to the first communication network and a second signal intensity corresponding to the second communication network;

a first communication protocol module, configured to, when the first signal intensity is greater than a first threshold, register the first service in the first communication network, wherein after the first service is registered successfully, a second communication protocol module is configured to search for the second communication network in accordance with a first predetermined strategy if the second communication protocol module determines that the acquired second signal intensity is less than a second threshold, and notifies the first communication protocol module to register the second service in the first communication network; and the second communication protocol module, configured to, when the second signal intensity is greater than the second threshold, register the second service in the second communication network, wherein after the second service is registered successfully, the first communication protocol module is configured to search for the first communication network in accordance with a second predetermined strategy if the first communication protocol module determines that the acquired first signal intensity is less than or equal to the first threshold, and notifies the second communication module to register the first service in the second communication network.

8. The communication terminal of claim 7, wherein the first communication network is a 2G network, the second communication network is a 3G network, the first service is a circuit-switched (CS) service, and the second service is a packet-switched (PS) service.

9. The communication terminal of claim 7:

wherein the first communication protocol module is further configured to, after receiving an indication indicating that the acquired second signal intensity corresponding to the second communication network is less than or equal to the second threshold, register the second service in the first communication network;

wherein the second communication protocol module is further configured to, after receiving an indication indicating that the acquired first signal intensity corresponding to the first communication network is less than or equal to the first threshold, register the first service in the second communication network; and wherein protocols that support the connection and communication between the communication terminal and the second communication network are stored in the second protocol stack, and protocols that support the connection and communication between the communication terminal and the first communication network are stored in the first protocol stack.

10. The communication terminal of claim 7:

wherein the first communication protocol module is further configured to acquire a second communication network neighboring cell in system information, and notify the second communication protocol module of the second communication network neighboring cell to assist the second communication protocol module to narrow the range of searching for cells; and wherein the second communication protocol module is further configured to acquire a first communication network neighboring cell in system information, and notify the first communication protocol module of the first communication network neighboring cell to assist the first communication protocol module to narrow the range of searching for cells.

* * * * *